United States Patent
Breuer et al.

(10) Patent No.: US 8,317,656 B2
(45) Date of Patent: Nov. 27, 2012

(54) METHOD FOR OPERATING A DRIVETRAIN OF A MOTOR VEHICLE

(75) Inventors: Jochen Breuer, Tettnang (DE); Mario Steinborn, Friedrichschafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 329 days.

(21) Appl. No.: 12/743,471

(22) PCT Filed: Dec. 1, 2008

(86) PCT No.: PCT/EP2008/066489
§ 371 (c)(1),
(2), (4) Date: May 18, 2010

(87) PCT Pub. No.: WO2009/071497
PCT Pub. Date: Jun. 11, 2009

(65) Prior Publication Data
US 2010/0285922 A1 Nov. 11, 2010

(30) Foreign Application Priority Data
Dec. 6, 2007 (DE) .......................... 10 2007 055 720

(51) Int. Cl.
*B60W 10/04* (2006.01)
*B60W 10/10* (2012.01)
(52) U.S. Cl. ......................................... 477/115; 477/908
(58) Field of Classification Search .................... 477/34, 477/115, 908
See application file for complete search history.

(56) References Cited

U.S. PATENT DOCUMENTS

| 4,850,236 | A |   | 7/1989  | Braun |
| 5,335,566 | A | * | 8/1994  | Genise et al. ................. 477/124 |
| 5,533,946 | A |   | 7/1996  | Markyvech |
| 6,095,947 | A |   | 8/2000  | Genise |
| 6,105,449 | A |   | 8/2000  | Genise et al. |
| 6,224,511 | B1 |  | 5/2001  | Steeby |
| 8,066,617 | B2 | * | 11/2011 | Steinborn et al. ............... 477/15 |

FOREIGN PATENT DOCUMENTS

| DE | 197 26 567 A1 | 12/1998 |
| DE | 199 23 867 A1 | 11/2000 |
| EP | 0 612 642 A1  | 8/1994  |
| EP | 0 676 566 A1  | 10/1995 |
| EP | 0 896 172 A2  | 2/1999  |
| EP | 1 055 845 A2  | 11/2000 |

* cited by examiner

*Primary Examiner* — Tisha Lewis
(74) *Attorney, Agent, or Firm* — Davis & Bujold, PLLC

(57) ABSTRACT

A method of operating a drivetrain of a vehicle comprising an engine, a clutch and a transmission comprising a claw-shifted main transmission and a synchronized upstream and/or downstream group, such that shifting from a current gear to a target gear is accomplished by actuating one of the synchronized upstream or downstream group and without actuating the engaged clutch and the claw-shifted main transmission. The method includes reducing engine torque and, when the engine torque is less than or equal to a limit value, the synchronized upstream or downstream group is actuated to disengage the currant gear. Then, when the engine torque is approximately zero, the synchronized downstream or upstream group is disengaged and held in neutral, and the speed of the engine is then adjusted to a target speed. The synchronized upstream or downstream group is actuated to engage the target gear and upon engagement the engine torque is increased.

10 Claims, 1 Drawing Sheet

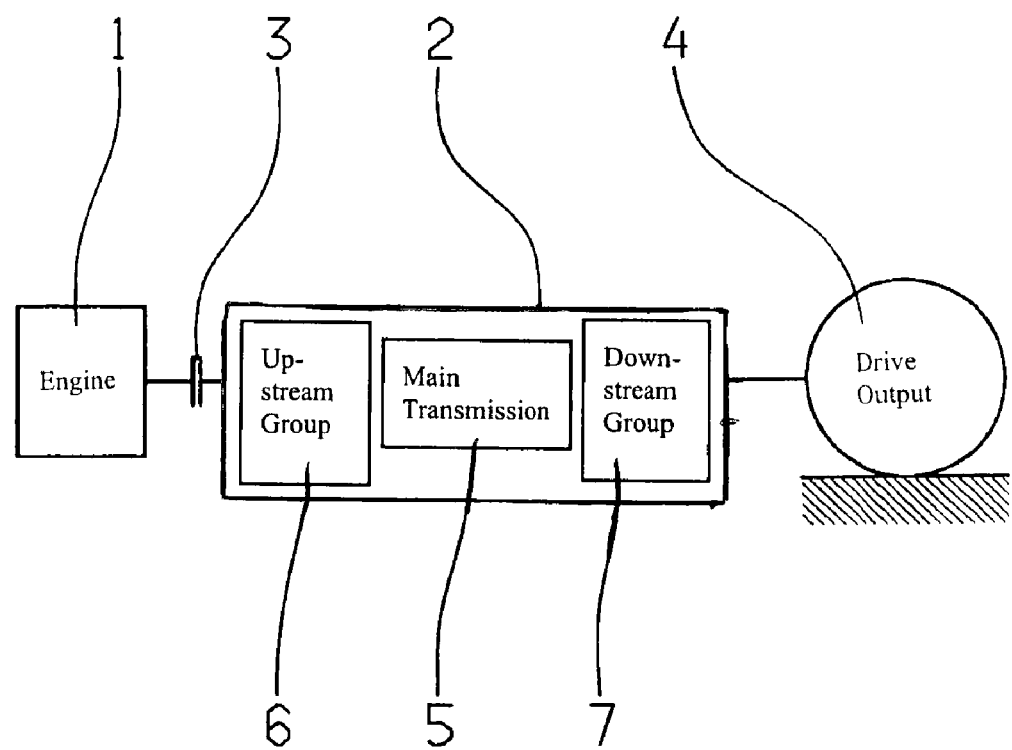

METHOD FOR OPERATING A DRIVETRAIN OF A MOTOR VEHICLE

This application is a National Stage completion of PCT/EP2008/066489 filed Dec. 1, 2008, which claims priority from German patent application serial no. 10 2007 055 720.7 filed Dec. 6, 2007.

FIELD OF THE INVENTION

The invention concerns a method for operating a drivetrain of a motor vehicle comprising an engine, a multi-group transmission and a clutch connected between the engine and the multi-group-group transmission, such that the multi-group transmission comprises a main transmission shifted by a claw clutch and at least one synchronized group, namely a synchronized upstream group and/or a synchronized downstream group.

BACKGROUND OF THE INVENTION

If a shift from a current gear to a target gear is to be carried out in a multi-group transmission of a drivetrain of a motor vehicle of such type, in drivetrains known from prior practice this takes place in such manner that to carry out the shift from the current to the target gear, the clutch connected between the multi-group transmission and the engine of the drivetrain is at least partially disengaged and is then engaged again. In addition, if a synchronized group, i.e. the synchronized upstream or the synchronized downstream group is shifted, the claw-clutch-shifted main transmission can be moved to its neutral position. Because the clutch is at least partially disengaged during shifting and the sometimes necessary movement of the claw-clutch-shifted main transmission to a neutral position, shifting times are relatively long. Furthermore, comfort problems may arise during the load reduction and/or disengagement of the drivetrain by means of the clutch.

With regard to the published prior art concerning the performance of gearshifts, in a drivetrain with a multi-group transmission, reference can be made to DE 197 26 567 A1 and EP 0 612 642 A1 in which, to carry out a shift from a current to a target gear, the clutch connected between the engine and the multi-group transmission is always actuated.

SUMMARY OF THE INVENTION

Starting from there, the present invention addresses the problem of providing a new type of method for operating a drivetrain that comprises an engine, a multi-group transmission and a clutch connected between the engine and the multi-group transmission, with which rapid shift sequences can be carried out.

According to the invention a shift from a current gear to a target gear is carried out without actuating the engaged clutch and without actuating the claw-clutch-shifted main transmission, exclusively by actuating the synchronized upstream or the synchronized downstream group in such manner that: a) first an engine torque is reduced and when the engine torque reaches or falls below a limit value the synchronized upstream or the synchronized downstream group is actuated in the direction of shifting out of or disengaging the current gear that is to be disengaged; b) then, when the engine torque is almost zero, the synchronized upstream or synchronized downstream group is disengaged and brought to or held in the neutral position; c) then, the engine is brought to a target speed which depends on the target gear to be engaged; d) thereafter, when the engine has reached the target speed to within a defined tolerance, the synchronized upstream or synchronized downstream group is actuated in the direction of shifting into or engaging the target gear to be engaged; e) once the synchronized upstream or downstream group has been engaged, the engine torque is increased again.

According to this, a shift from a current gear to a target gear is carried out without actuating the engaged clutch by actuating the claw-clutch-shifted main transmission and by actuating a synchronized group in such manner that: a) first an engine torque is reduced and when the engine torque reaches or falls below a limit value the claw-shifted main transmission and/or the synchronized group is actuated in the direction of shifting out of or disengaging the current gear to be disengaged; b) then, when the engine torque is approximately zero, the claw-shifted main transmission and the synchronized group are disengaged and the synchronized group is brought to or kept in the neutral position; c) then the engine is brought to a target speed which depends on the target gear to be engaged; d) thereafter, when the engine speed reaches the target speed to within a defined tolerance, the synchronized group is actuated in the direction of shifting into or engaging the target gear, and during this a synchronization of the synchronized group takes place; e) then, when the synchronization of the synchronized group to within a defined tolerance has taken place, the claw-shifted main transmission is actuated in the direction of shifting into or engaging the target gear; f) and once the claw-shifted main transmission and the synchronized group have been engaged, the engine torque is increased again.

With the method according to the invention, according to both aspects of the present invention rapid shift sequences can be carried out in a multi-group transmission of a drivetrain. In both methods according to the invention a shift from a current gear to a target gear takes place without actuating the clutch connected between the multi-group transmission and the engine of the drivetrain. Shifts of a synchronized group, namely a synchronized upstream group and/or a synchronized downstream group, are divided into the phases of shifting out of or disengaging the current gear, holding in neutral, synchronization, and shifting into or engaging the target gear.

Thus, shifts of a synchronized group are carried out without actuating the clutch when the clutch is engaged. The synchronized group is synchronized with the help of the engine. When a shift of a synchronized group overlaps with a shift of the claw-shifted main transmission, the claw-shifted main transmission is synchronized by means of the synchronized group and the engine. Accordingly, in the sense of the present invention shifts of a multi-group transmission are carried out without actuating the engaged clutch connected between the multi-group transmission and the drive engine of the drivetrain, and the shifting of a synchronized group is divided into the phases of disengagement, holding in neutral, synchronization and engagement. Thus, in principle a synchronized group is actuated in the same manner as the unsynchronized, claw-shifted main transmission. In this way rapid shifts can be carried out with a high level of shifting comfort.

BRIEF DESCRIPTION OF THE DRAWINGS

Example embodiments of the invention, to which it is not limited, are explained in more detail with reference to the drawing, which shows:

The sole FIGURE is a very schematic drivetrain layout to make clear the method according to the invention for operating a drivetrain of a motor vehicle that comprises an engine, an automated change-speed transmission and an automated clutch.

DETAILED DESCRIPTION OF THE PREFERRED EMBODIMENTS

The present invention concerns a method for operating a drivetrain of a motor vehicle that comprises an engine, a multi-group transmission and a clutch connected between the engine and the multi-group transmission.

The sole FIGURE shows a very schematic drivetrain layout of such a drivetrain, in which the engine 1, the multi-group transmission 2, the clutch 3 connected between the engine 1 and the multi-group transmission 2 and a drive output 4 are shown. The multi-group transmission 2 comprises a main transmission 5, an upstream group 6 and a downstream group 7. The main transmission 5 is an unsynchronized, claw-shifted main transmission.

The upstream group 6 and the downstream group 7 are synchronized groups of the multi-group transmission 2. For example the upstream group 6 can be a splitter group and the downstream group 7 a range group. Likewise, the upstream group 6 could be a range group and the downstream group 7 a splitter group.

Although the multi-group transmission 2 shown in the sole FIGURE has two synchronized groups 6 and 7 in addition to the unsynchronized claw-shifted main group 5, the invention can also be used with drivetrains which, besides the unsynchronized claw-shifted main group 5, also comprise only one synchronized upstream group 6 or only one synchronized downstream group 7.

By virtue of the invention, in a multi-group transmission 2 of such a drivetrain rapid shift sequences can now be carried out very comfortably. To do this, shifts in a synchronized group, i.e. in the synchronized upstream group 6 and/or in the synchronized downstream group 7, are divided into a number of phases, namely the shifting out or disengagement of a current gear, holding in neutral, synchronization and shifting into or engaging a target gear.

In a first version of the present invention a shift is carried out from a current gear to a target gear in a multi-group transmission 2 without actuating the engaged clutch 3 and without actuating the claw-shifted main transmission 5, exclusively by actuating the synchronized upstream group 6 or the synchronized downstream group 7 in such manner that first an engine load or engine torque is reduced, and when the engine load or engine torque has reached or fallen below a limit value the synchronized upstream group 6 or the synchronized downstream group 7 is actuated in the direction of shifting out of or disengaging the current gear to be disengaged. Then, when the engine load or engine torque is approximately zero, the synchronized upstream group 6 or the synchronized downstream group 7 is disengaged and brought to a neutral position or held therein, and thereby the synchronization of the synchronized upstream group 6 or of the synchronized downstream group 7 is stopped or interrupted. Thereafter, the engine is brought to a target speed that depends on the target gear to be engaged. The target speed to which the engine is brought either corresponds to a target speed appropriate for the target gear, or it can be higher or lower than that speed. The target speed to which the engine is brought can depend on the structure of the synchronizer of the synchronized upstream 6 group or the synchronized downstream group 7. When the engine has reached the target speed to within a defined tolerance, the synchronized upstream 6 or downstream 7 group is actuated in the direction of shifting into or engaging the target gear to be engaged, and during this the synchronized upstream 6 or downstream 7 group is synchronized by means of the engine 1. Once the synchronized upstream group 6 or the synchronized downstream group 7 has been engaged, the engine torque or engine load is increased or switched on again.

During the actuation of the synchronized upstream 6 or downstream 7 group in the direction of shifting into or engaging the target gear to be engaged, if a so-termed tooth-on-tooth position occurs, then despite this the engine torque or engine load is increased farther and the synchronized upstream 6 or downstream 7 group is actuated farther in the direction of shifting into or engaging the target gear to be engaged, in order to eliminate the tooth-on-tooth position. During this the increase of the engine load or engine torque can be adapted in order to assist and ensure the elimination of the tooth-on-tooth position.

Thus, according to this first version of the present invention a shift in the multi-group transmission 2 is carried out with the clutch 3 unactuated and engaged and without actuating the claw-shifted main transmission 5, exclusively by actuating the synchronized upstream group 6 or the synchronized downstream group 7, the synchronization of the synchronized upstream 6 or downstream 7 group being effected by the engine 1. The synchronized group actuated is preferably a splitter group.

In a method according to the invention representing a second version of the present invention, a shift from a current gear to a target gear is also carried out without actuating the engaged clutch 3, but with actuation of the unsynchronized claw-shifted main transmission 5 and by actuating a synchronized group 6 or 7, such that to do this, again an engine load or engine torque is first reduced, and when the engine load or torque has reached or fallen below a limit value the claw-shifted unsynchronized main transmission 5 and/or the synchronized group 6 or 7 is/are actuated in the direction of shifting out of or disengaging the current gear to be disengaged.

Thereafter, when the engine torque or engine load is approximately zero, both the claw-shifted main transmission 5 and the synchronized group 6 or 7 are disengaged and the synchronized group 6 or 7 is brought to or held in a neutral position. Thereby, the synchronization of the synchronized group 6 or 7 is stopped or interrupted. If necessary, the unsynchronized claw-shifted main transmission 5 is brought to or kept in a neutral position. Then, the engine 1 is brought to a target speed that depends on the target gear to be engaged, the target speed to which the engine 1 is brought being a target speed appropriate for the target gear or being higher or lower than the target speed. The target speed to which the engine is brought may depend on the structure of the synchronizer.

Then, when the engine 1 has reached the target speed to within a defined tolerance, the synchronized group 6 or 7 is actuated in the direction of shifting into or engaging the target gear to be engaged, and during this, synchronization of the synchronized group 6 or 7 takes place. Thus, the synchronization of the synchronized group 6 or 7 begins and at the same that of the unsynchronized, claw-shifted main transmission 5 takes place. Thereafter, when the synchronization of the synchronized group 6 or 7 has taken place to within a defined tolerance, for example a defined speed tolerance and/or time tolerance, the unsynchronized, claw-shifted main transmission 5 is actuated in the direction of shifting into or engaging the target gear to be engaged. Now, both the synchronized group 6 or 7 and also the claw-shifted main transmission 5 are in the process of shifting into or engaging the target gear. Once the synchronized group 6 or 7 and the claw-shifted main transmission 5 have been engaged, the engine torque or engine load is increased or switched on again.

During the increase or switching on of the engine torque or engine load, if the synchronized group 6 or 7 and/or the claw-shifted, unsynchronized main transmission 5 adopt a tooth-on-tooth position, despite this the engine torque or engine torque or engine load is increased farther and synchronized group 6 or 7 and/or the claw-shifted unsynchronized main transmission 5 are actuated farther in the direction towards shifting into or engaging the target gear to be engaged, in order to eliminate the tooth-on-tooth position. For the better and more sure elimination of the tooth-on-tooth position, the control of the engine torque or engine load can be adapted to the synchronized group 6 or 7 and/or the claw-shifted main transmission 5.

With the help of the method according to the invention, rapid shifts can be carried out with great comfort. In particular, when only one synchronized group of the multi-group transmission is actuated, then by virtue of the engine synchronization the synchronized group is less severely stressed. Especially in the cold, this supports and simplifies the synchronization.

Indexes
1 Engine
2 Multi-group transmission
3 Clutch
4 Drive output
5 Main transmission
6 Upstream group
7 Downstream group

The invention claimed is:

1. A method for operating a drivetrain of a motor vehicle comprising an engine, a multi-group transmission and a clutch connected between the engine and the multi-group transmission, the multi-group transmission comprising a claw-shifted main transmission and at least one of a synchronized upstream group and a synchronized downstream group, and a gear shift from a current gear to a target gear being accomplished exclusively by actuating one of the synchronized upstream group and the synchronized downstream group and without actuating the engaged clutch and without actuating the claw-shifted main transmission, the method comprising the steps of:
   a) reducing engine torque and, when the engine torque has either reached or fallen below a limit value, actuating the one of the synchronized upstream group and the synchronized downstream group in a direction of disengaging the current gear to be disengaged;
   b) when the engine torque is approximately zero, disengaging the one of the synchronized downstream group and the synchronized upstream group, and retaining the one of the synchronized downstream group and the synchronized upstream group in a neutral position;
   c) bringing the engine to a target speed that is dependant on the target gear to be engaged;
   d) when the engine has reached the target speed to within a defined tolerance, actuating the one of the synchronized downstream group and the synchronized upstream group in a direction of engaging the target gear to be engaged; and
   e) increasing the engine torque once the one of the synchronized downstream group and the synchronized upstream group is engaged.

2. The method according to claim 1, further comprising the step of, when the engine torque is approximately zero, one of stopping and interrupting synchronization of the one of the synchronized downstream group and the synchronized upstream group.

3. The method according to claim 1, further comprising the step of defining the target speed, to which the engine is brought, to correspond to one of a target speed appropriate for the target gear, a target speed that is higher than the target speed for the target gear and a target speed that is lower than the target speed for the target gear.

4. The method according to claim 1, further comprising the step of, if the one of the synchronized downstream group and the synchronized upstream group assumes a tooth-on-tooth position, increasing the engine torque farther and then actuating the one of the synchronized downstream group and the synchronized upstream group farther in the direction of engaging the target gear to be engaged.

5. A method for operating a drivetrain of a motor vehicle comprising an engine, a multi-group transmission and a clutch connected between the engine and the multi-group transmission, the multi-group transmission comprising a claw-shifted main transmission and at least one of a synchronized upstream group and a synchronized downstream group, and a gear shift from a current gear to a target gear being accomplished by actuating at least one of the synchronized upstream group and the synchronized downstream group and without actuating the engaged clutch by actuating the claw-shifted main transmission, the method comprising the steps of:
   a) reducing an engine torque and when the engine torque has either reached or fallen below a limit value, actuating at least one of the claw-shifted main transmission, the synchronized upstream group and the synchronized downstream group in a direction of disengaging the current gear to be disengaged;
   b) when the engine torque is approximately zero, disengaging the claw-shifted main transmission and at least one of the synchronized upstream group and the synchronized downstream group, and retaining the at least one of the synchronized upstream group and the synchronized downstream group in a neutral position;
   c) bringing the engine to a target speed that is dependant on the target gear to be engaged;
   d) when the engine reaches the target speed and is within a defined tolerance, actuating the at least one of the synchronized upstream group and the synchronized downstream group in a direction of engaging the target gear to be engaged so as to synchronize the at least one of the synchronized upstream group and the synchronized downstream group;
   e) when synchronization of the at least one of the synchronized upstream group and the synchronized downstream group occurs and is within a defined tolerance, actuating the claw-shifted main transmission in a direction toward engaging the target gear to be engaged; and
   f) increasing the engine torque once the claw-shifted main transmission and the at least one of the synchronized upstream group and the synchronized downstream group are engaged.

6. The method according to claim 5, further comprising the step of, when the engine torque is approximately zero, one of stopping and interrupting synchronization of the at least one of the synchronized upstream group and the synchronized downstream.

7. The method according to claim 5, further comprising the step of retaining the claw-shifted main transmission a neutral position.

8. The method according to claim 5, further comprising the step of defining the target speed, to which the engine is brought, as one of corresponding to the target speed appropriate for the target gear, higher than the target speed appropriate for the target gear and lower than the target speed appropriate for the target gear.

9. The method according to claim 5, further comprising the step of, when the engine has either reached the target speed or is within a defined tolerance, simultaneously synchronizing the synchronized group and the claw-shifted main transmission.

10. The method according to claim 5, further comprising the step of, when a tooth-on-tooth position occurs during engagement of the target gear at least one of further increasing the engine torque and further actuating at least one of the claw-shifted main transmission, the synchronized upstream group and the synchronized downstream group in the direction of engaging the target gear to be engaged.

* * * * *